No. 617,748. Patented Jan. 17, 1899.
A. O. HURLEY.
GLASS TANK.
(Application filed Feb. 4, 1898.)
(No Model.) 2 Sheets—Sheet 1.

Witnesses:
Walter Samarias
Robt. C. Totten

Inventor:
Andrew O. Hurley
By Kay & Totten
Attorneys.

No. 617,748. Patented Jan. 17, 1899.
A. O. HURLEY.
GLASS TANK.
(Application filed Feb. 4, 1898.)
(No Model.) 2 Sheets—Sheet 2.

Witnesses:

Inventor:
Andrew O. Hurley
By Ray N. Totten
Attorneys.

UNITED STATES PATENT OFFICE.

ANDREW O. HURLEY, OF JEANNETTE, PENNSYLVANIA.

GLASS-TANK.

SPECIFICATION forming part of Letters Patent No. 617,748, dated January 17, 1899.

Application filed February 4, 1898. Serial No. 669,126. (No model.)

*To all whom it may concern:*

Be it known that I, ANDREW O. HURLEY, a resident of Jeannette, in the county of Westmoreland and State of Pennsylvania, have invented a new and useful Improvement in Glass-Tanks; and I do hereby declare the following to be a full, clear, and exact description thereof.

My invention relates to glass-tank furnaces. It has been found by experience that in the operation of these furnaces the walls of the melting-section, particularly, crumble and wear away, so that the particles of the refractory material of which they are composed become mixed with the molten glass, and injure the quality of same. At the same time the walls have to be renewed frequently, thereby adding largely to the expense of the operation of these tanks. This crumbling or wearing away of the walls is chiefly due to the action of the flux in the molten glass which attacks the refractory material of the walls and disintegrates same. This action takes effect more particularly at the melting-section of the furnace, as it is in this section that the highest temperature is maintained in order to melt the batch properly and provide for the fining of same. The glass then flows to the gathering-section, which is maintained at a lower temperature, and consequently the action on the walls is not so severe. The object of my invention, therefore, is to provide means for preventing this disintegration of the walls of the tank, and thus not only improve the quality of the glass, but increase the life of the walls.

My invention consists, generally stated, in bringing a cooling fluid directly in contact with the molten glass, so as to chill the same and form a lining of glass, which protects the walls and prevents the wearing away of same.

To enable others skilled in the art to make and practice my invention, I will describe the same more fully, referring to the accompanying drawings, in which—

Figure 1:
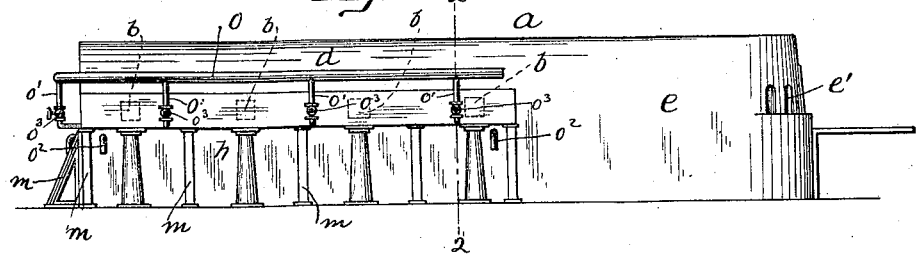
Figure 2:
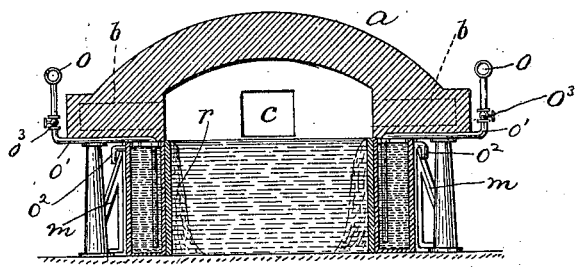
Figure 3:
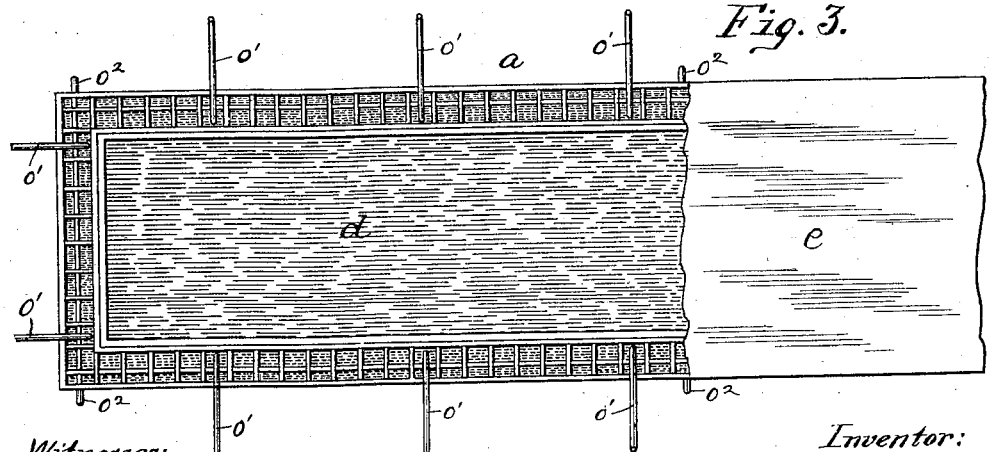
Figure 4:
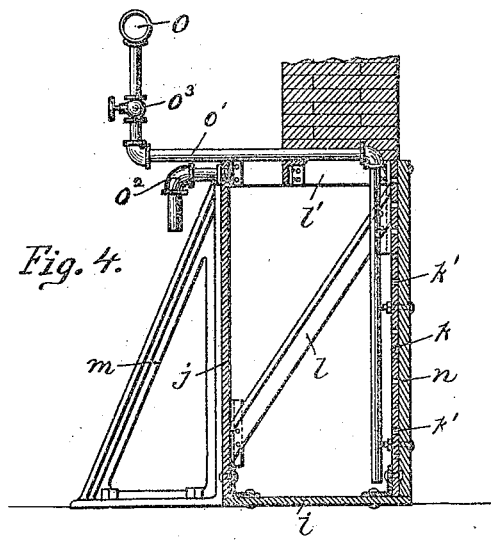
Figure 5:
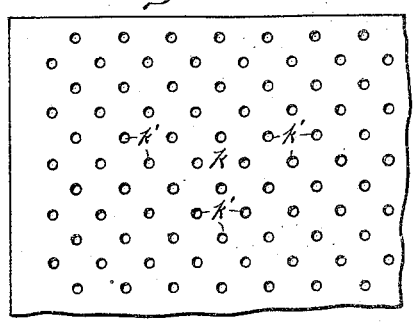
Figure 6:
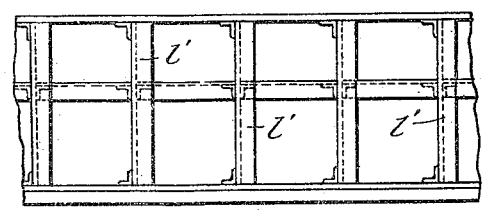
Figure 7:
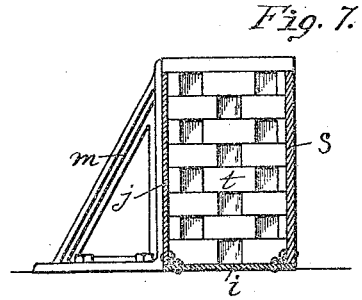

Figure 1 is a side elevation of a glass-tank furnace embodying my invention. Fig. 2 is a cross-section on the line 2 2, Fig. 1. Fig. 3 is a top view with a portion of the roof removed. Fig. 4 is an enlarged cross-section of the water-tank. Fig. 5 is a face view of a portion of the perforated metal plate forming the walls of the furnace. Fig. 6 is a plan view, enlarged, of a portion of the water-tank. Fig. 7 is a modified form.

Like letters of reference indicate like parts in each view.

My invention may be applied to different forms of glass-tank furnaces, as the arrangement of heating-flues, &c., forms no part of this invention.

The letter $a$ represents such a glass-tank furnace having the regenerators $b$ located along the sides of the melting-section and having the ports $c$ leading into said melting-section. These regenerators only extend along the melting-section, as it is in this section of the furnace that the high temperature is maintained for the melting operation. The tank-furnace may therefore be said to be divided into the melting-section $d$ and the gathering-section $e$. The gathering end has the regular gathering-ports $e'$. The roof $f$ is supported independently of the walls in the ordinary manner to allow for the repairing of the said walls without interfering with said roof.

The walls $g$ of the forward end of the furnace or the gathering-section may be composed of bricks or refractory material for the reason more fully hereinafter set forth.

Surrounding the melting-section $d$ of the furnace is the reservoir $h$, said reservoir forming the walls of this portion of the furnace. This reservoir $h$ is preferably constructed of metal consisting of the bottom plate $i$, the outer side plates $j$ and the inner side plate $k$, which really form the walls of the furnace in the melting-section. These plates $i$, $j$, and $k$ are secured together by angles and are so connected as to form a water-tight reservoir. The interior braces $l$ and cross-bars $l'$ act to reinforce the plates, and the outside braces $m$ further strengthen the construction. The inner plate $k$ has the orifices $k'$ formed at intervals over its surface, said orifices being preferably staggered, as shown. Bolted or otherwise secured to the plate $i$ is the wooden lining $n$, bolted or otherwise secured to said plate $i$. This wooden lining is only a temporary affair, as will appear from the description which follows.

In order to supply the reservoir with water and keep up a circulation of the same therein, I provide the main supply-pipe o, which extends longitudinally of the reservoir and from which project the branch pipes o'. These branch pipes o' enter the reservoir and preferably extend down adjacent to the bottom thereof, so that the fresh water being admitted near the bottom of said reservoir will rise therein and pass out through the overflow-pipes o². The pipes o' are furnished with suitable valves o³.

The batch for forming the glass is introduced into the front end of the furnace, and the furnace is then heated up to the proper temperature to melt the batch, which gradually resolves itself into a molten mass. As the temperature increases the glass becomes thinner and flows toward the gathering end. The high heat of this molten mass, which is in contact with the wooden lining, will burn away and destroy said lining. As the lining is consumed the metal plate k becomes exposed to the molten glass, while the orifices k' bring the furnace into communication with the reservoir. The glass will not enter the reservoir, however, as the water in said reservoir will pass through the orifices and chill or stiffen the glass adjacent to the plate, so that a layer of chilled glass, such as represented at r, Fig. 2, will be formed. The constant circulation of the water will maintain this layer of chilled glass as long as the water flows in the reservoir. These glass-tank furnaces are operated continuously, and the heat is kept at this high temperature during the entire "fire," or from early fall until the succeeding summer, when the annual shut-down occurs. The consequence is that the hot molten glass does not have an opportunity to reach the walls of the furnace, but is held within this basin, as it were, of chilled glass, as there is generally a layer of semifluid or partially solid glass on the bottom of these furnaces, as the depth of the glass will prevent the heat from penetrating same so as to keep it as thin as in the upper portion, where the heat is most intense, while at the same time an air-chamber is sometimes located under the floor of the furnace. This wall of chilled glass will not be hot enough to affect the iron plates, and, furthermore, said plates have a circulating stream of water constantly in contact therewith, which cools same. The flux does not get an opportunity to attack the plates and no disintegration of the plate results therefrom.

While the construction above described I believe to be well adapted to carry out my invention, yet I do not wish to limit myself in any sense to this particular form.

In Fig. 7 I have illustrated a modified form of my invention in which the inner metal plate is omitted, a wooden lining s alone being employed. The interior of the reservoir has the brick pillars t built therein at suitable intervals apart and formed of checker-work. These pillars act to brace the sides. As the wooden lining is destroyed, as before, the water will flow directly in contact with the molten glass and form the same kind of a chilled layer of glass as before described. The chilled glass will prevent the flux of the molten glass from attacking and disintegrating the bricks of the pillars.

By my invention I am enabled to avoid the "stony" glass, which is very frequently the cause of defects in the finished glass, while at the same time the walls of the furnace do not wear out so rapidly and the expense of renewing same so frequently is avoided.

I do not wish to limit myself to any particular form of construction for obtaining this chilled layer of glass, but wish to claim, broadly, the forming of such a layer by bringing a cooling fluid into direct contact with the glass.

What I claim as my invention, and desire to secure by Letters Patent, is—

1. The method of working glass-tank furnaces, consisting in bringing a cooling fluid directly in contact with the molten glass contained within the furnace, substantially as set forth.

2. A glass-tank furnace having a melting-chamber therein, a reservoir for holding a cooling fluid around said melting-chamber, and means for bringing said fluid into contact with the glass in said chamber, substantially as set forth.

3. A glass-tank furnace having a melting-chamber therein, a reservoir for holding a cooling fluid around said melting-chamber, and a combustible partition separating said fluid from the molten glass, substantially as set forth.

4. A glass-tank furnace having a melting-chamber therein, a reservoir for holding a cooling fluid around said melting-chamber, a perforated metal plate forming the inner side of said reservoir and the walls of said melting-chamber, and a combustible lining on said plate, substantially as set forth.

In testimony whereof I, the said ANDREW O. HURLEY, have hereunto set my hand.

ANDREW O. HURLEY.

Witnesses:
ROBT. D. TOTTEN,
ROBERT C. TOTTEN.